United States Patent [19]
Fineberg

[11] Patent Number: 5,842,162
[45] Date of Patent: Nov. 24, 1998

[54] METHOD AND RECOGNIZER FOR RECOGNIZING A SAMPLED SOUND SIGNAL IN NOISE

[75] Inventor: Adam B. Fineberg, Saratoga, Calif.

[73] Assignee: Motorola, Inc., Schaumburg, Ill.

[21] Appl. No.: 935,647

[22] Filed: Sep. 23, 1997

Related U.S. Application Data

[63] Continuation-in-part of Ser. No. 613,269, Mar. 8, 1996, abandoned.

[51] Int. Cl.$^6$ .................................. G10L 5/06; G10L 9/00
[52] U.S. Cl. ............................................... 704/233; 704/234
[58] Field of Search ........................................ 704/233, 234

[56] References Cited

U.S. PATENT DOCUMENTS

| | | | |
|---|---|---|---|
| 5,023,910 | 6/1991 | Thomson | 95/2.31 |
| 5,025,471 | 6/1991 | Scott et al. . | |
| 5,581,654 | 12/1996 | Tsutsui . | |
| 5,586,215 | 12/1996 | Stork et al. | 395/2.41 |
| 5,969,193 | 11/1990 | Scott et al. . | |

OTHER PUBLICATIONS

Tsoukalas, D. et al., Speech Enhancement Using Psychoacoustic Criteria, ICASSP 1993, Apr. 1993, Section 2, Sections 2.1–2.3, Figs. 1–4.

Millner, B. P., Vaseghi, S. V., Comparison of Some Noise–Compensation Methods for Speech Recognition in Adverse Environments, IEE Proceedings Vision Image, and Signal Processing, vol. 141, No. 5.

Hirsch H G, Ehrlicher C, Noise Estimation Techn. for Robust Speech Recog., ICASSP '95 pp. 153–156, May 1995.

Parsons T, Voice and Speech Processing, McGraw Hill, pp. 170–171 and 297–303, Dec. 1987.

Erell, Adoram et al., "Energy Conditioned Spectral Estimation for Recognition of Noisy Speech", *IEEE Transactions on Speech and Audio Processing*, vol. 1, No. 1, Jan. 1993.

Tufts, Donald W. et al., "Blind Wiener Filtering: Estimation of a Random Signal in Noise Using Little Prior Knowledge", *IEEE*, 1993.

Hermansky, Hynek et al., "Recognition of Speech in Additive and Convolutional Noise Based on Rasta Spectral Processing".

Bateman, D.C. et al., "Spectral Contrast Normalization and Other Techniques for Speech Recognition in Noise", *IEEE*, 1992.

Liu, Fu–Hua et al., "Efficient Cepstral Normalization for Robust Speech Recognition".

*Primary Examiner*—David D. Knepper
*Assistant Examiner*—Robert Louis Sax
*Attorney, Agent, or Firm*—J. Ray Wood

[57] ABSTRACT

A sound recognizer uses a feature value normalization process to substantially increase the accuracy of recognizing acoustic signals in noise. The sound recognizer includes a feature vector device which determines a number of feature values for a number of analysis frames, a min/max device which determines a minimum and maximum feature value for each of a number of frequency bands, a normalizer which normalizes each of the feature values with the minimum and maximum feature values resulting in normalized feature vectors, and a comparator which compares the normalized feature vectors with template feature vectors to identify one of the template feature vectors that most resembles the normalized feature vectors.

22 Claims, 5 Drawing Sheets

$$\begin{array}{cccc}
\lvert v_{11} \rvert & v_{21} \; v_{31} & \ldots\ldots\ldots & v_{i1} \\
\lvert v_{12} \rvert & v_{22} \; v_{32} & \ldots\ldots\ldots & v_{i2} \\
\lvert v_{13} \rvert & v_{23} \; v_{33} & \ldots\ldots\ldots & v_{i3} \\
\vdots & & & \vdots \\
\lvert v_{1j} \rvert & v_{2j} \; v_{3j} & \ldots\ldots\ldots & v_{ij}
\end{array}$$

$$\begin{array}{cccc}
\lvert \tilde{v}_{11} \rvert & \tilde{v}_{21} \; \tilde{v}_{31} & \ldots\ldots\ldots & \tilde{v}_{i1} \\
\lvert \tilde{v}_{21} \rvert & \tilde{v}_{22} \; \tilde{v}_{23} & \ldots\ldots\ldots & \tilde{v}_{i2} \\
\lvert \tilde{v}_{31} \rvert & \tilde{v}_{32} \; \tilde{v}_{33} & \ldots\ldots\ldots & \tilde{v}_{i3} \\
\vdots & & & \vdots \\
\lvert \tilde{v}_{1j} \rvert & \tilde{v}_{2j} \; \tilde{v}_{3j} & \ldots\ldots\ldots & \tilde{v}_{ij}
\end{array}$$

610

FIG. 6

METHOD AND RECOGNIZER FOR RECOGNIZING A SAMPLED SOUND SIGNAL IN NOISE

CROSS-REFERENCE TO RELATED APPLICATIONS

This patent appplication is a continuation-in-part of patent application Ser. No. 08/613,269, filed Mar. 8, 1996, now abandoned.

FIELD OF THE INVENTION

The present invention relates, in general, to sound recognition, and in particular, to sound recognition in a high or variable noise environment.

BACKGROUND OF THE INVENTION

Advancing technology is moving steadily towards commercializing sound recognition by electronic devices such as speech recognizers. Generally there are two types of speech recognizers. One performs certain operations when the user gives short commands. A second type accepts dictated speech and enters the speech as text.

Most speech recognizers must be trained by the user before they can recognize words or phrases spoken by the user. These are termed "speaker dependent" speech recognizers, meaning that the speech recognizer must be trained by the user's voice before the recognizer can interpret user words and commands. Training a speech recognizer requires a user to speak certain words or phrases into the recognizer, usually many times, so that the speech recognizer can recognize the user's speech pattern. Later when the user is using the speech recognizer, the speech recognizer will compare the input voice signal with various stored speech templates to find a template that most resembles the input voice signal. This method is called "pattern matching".

A user will generally "train" a speech recognizer in an environment that has relatively low interfering noise. Subsequently, most speech recognizers must be used in environments of low interfering noise. Otherwise, the speech recognizer will not be able to separate spoken words from background noise. Where speech recognizers are used in low noise environments, a fairly high rate of recognition is achieved. If the speech recognizer is trained in a location having a moderate, constant background noise, and subsequently used in an environment that has the same moderate, constant background noise, a high recognition rate is achieved. However, when these speech recognizers are used in high noise environments with negative signal-to-noise ratios and environments where the noise present is different than the background noise present in the training session, the recognition rate falls to very low, unusable accuracy levels.

To correct the problem of background noise, conventional speech recognizers attempt to estimate the characteristics of the surrounding noise and then determine the effects on the user's voice. Various techniques are incorporated to build statistical or parametric models of the noise which are subtracted from the sound signal. In high and variable noise environments, these models are very inaccurate.

DETAILED DESCRIPTION OF THE INVENTION

A preferred embodiment of the present invention is used in robust voice recognition for sound recognizers. The preferred embodiment is well suited for use in cellular phones in automobiles where a user can keep both hands on the steering wheel, eyes on the road, and still make a phone call even with windows down and the stereo system on loud. Unlike conventional speech recognizers having an unusable, poor accuracy rate in high and/or variable noise conditions, sound recognizers designed according to the preferred embodiment of the present invention are robust and can obtain a very high accuracy rate in environments which have variable noise and noise levels greater than the volume of the user's speech.

The present invention shall be described hereafter in conjunction with the drawings. In particular, the preferred embodiment shall be described with reference to FIG. 1 in combination with the other figures.

The present invention may be applied to the recognition of any acoustic sound. For instance, the acoustic sound may be speech, grunting sounds, sounds made by animals, sounds made by instruments including percussion instruments, or any other type of sound. Most commonly, the present invention relates to recognition of speech.

Figure 1:
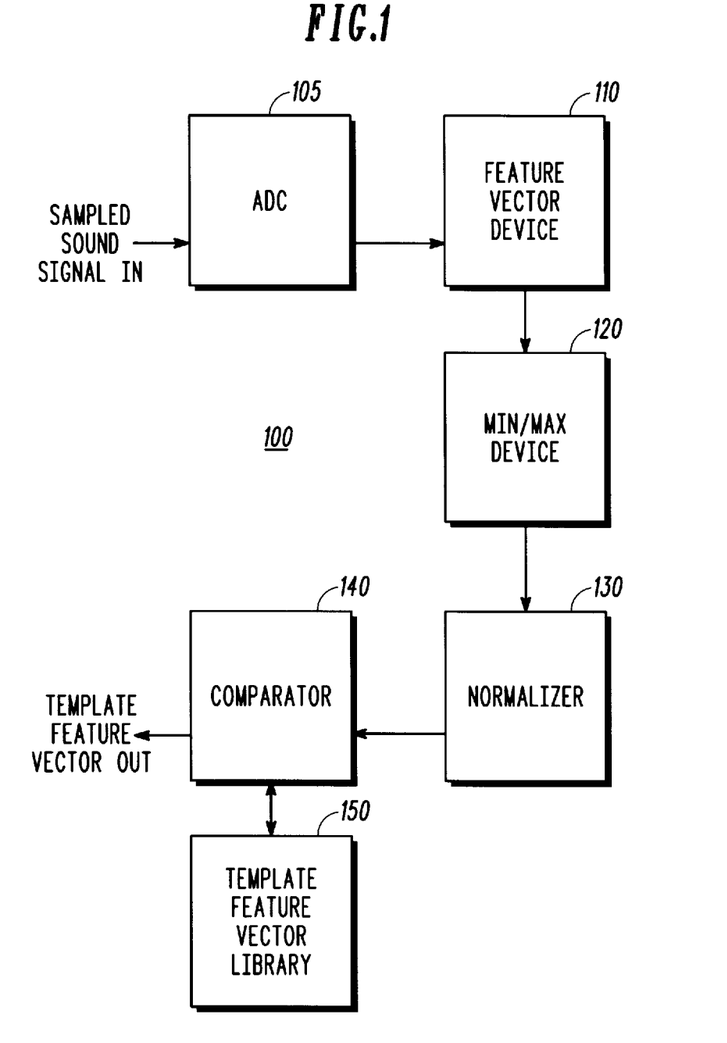
FIG. 1 is a block diagram of a voice recognizer according to a preferred embodiment of the present invention.

FIG. 1 shows a sound recognizer 100 according to a preferred embodiment of the present invention. In the preferred embodiment, an acoustic signal is input to an analog to digital converter (ADC) 105 of sound recognizer 100 where the signal is converted to a digital signal and sampled at a rate of 16 KHz. Other sampling rates may be used as appropriate, such as 8 KHz.

The sampled digital signals are input to feature vector device 110 which divides the sampled digital signals into analysis frames. Each analysis frame can be chosen to be either of fixed time width (such as 20 ms) or may be of varied time width depending upon signal characteristics such as pitch periods or other determining factors. The starting point of each analysis frame can be chosen to be either before, at, or after the end point of the previous frame. In the preferred embodiment, the analysis frames are chosen to be of fixed time width, and each analysis frame starts at the ending point of the previous analysis frame.

Figure 2:
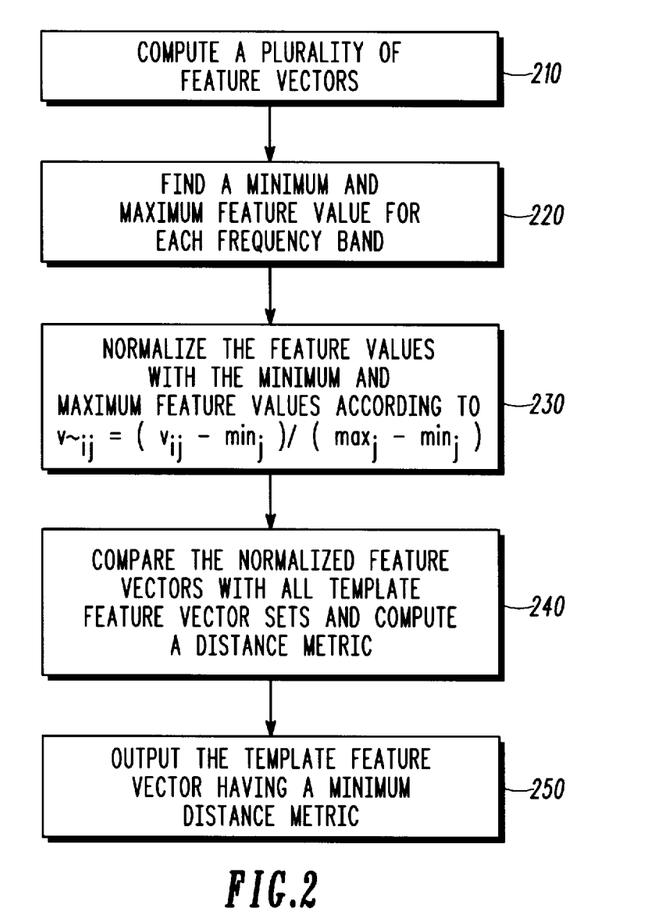
FIG. 2 shows a flow diagram of a preferred embodiment of the present invention.

For each of the analysis frames, feature vector device 110 computes a feature vector (210 of the flow chart of FIG. 2). For any given number of analysis frames, feature vector device 110 generates an equal number of feature vectors. A feature vector is a series of values, or plurality of feature values, which are derived from the sampled sound signal within a given analysis frame. These feature values are representative of the information contained in the sampled sound signal.

There are many techniques known to those skilled in the art of speech recognition which may be used to determine feature vectors. The techniques include Linear Predictive Coding (LPC) Coefficients, Cepstral Coefficients, Log Area Ratios, and Mel Scale Filterbank Coefficients. The preferred embodiment of the present invention utilizes the Mel Scale Filterbank Coefficients method, although the present invention will operate with other feature vector techniques, such as those listed above.

Mel Scale Filterbank Coefficients are computed in the following manner with reference to the flow chart of FIG. 3.

1. The sound signal samples for an analysis frame are passed through a high frequency pre-emphasizing filter to whiten the spectrum of the sound signal samples (310 of the flow chart of FIG. 3). This increases the relative energy in the high frequency components as compared to the energy of the low frequency components. Benefits are obtained when the preferred embodiment of the present invention is used with speech signals since low frequency components of speech have a relative energy greater than high frequency components and the two components are re-balanced in the pre-emphasizing filter. In the preferred embodiment, the filtering is accomplished according to the equation:

$$p_i(k) = s_i(k) - s_i(k-1)$$

where $s_i(k)$ is the sound signal sample at position k in analysis frame "i", $s_i(k-1)$ is the sound signal sample in analysis frame "i" at the previous position in time "k−1", and $p_i(k)$ is the pre-emphasized sound signal sample at position "k" in analysis frame "i". One skilled in the art of speech recognition will recognize that other pre-emphasis filters may be used.

2. The pre-emphasized sound signal samples for each analysis frame are bandpass filtered by a series of filters covering different frequency bands. The filters may be applied in any computational manner desired in either the time domain or the frequency domain. In the preferred embodiment, the filters are applied in the frequency domain. First, however, a power spectrum of the pre-emphasized sound signal samples in the analysis frames must be computed (320 of FIG. 3). The power spectrum is found by:

a. The pre-emphasized sound signal samples in the analysis frame are multiplied by samples of a window function, or weighting function. Any window function may be applied. For purposes of explaining the present invention, a simple rectangular window is assumed (the window has a value of 1.0 for all samples).

b. The Fourier Transform of the pre-emphasized sound signal samples in each windowed analysis frame is computed.

c. Values for the power spectrum are obtained by squaring the Fourier Transform values.

Figure 3:
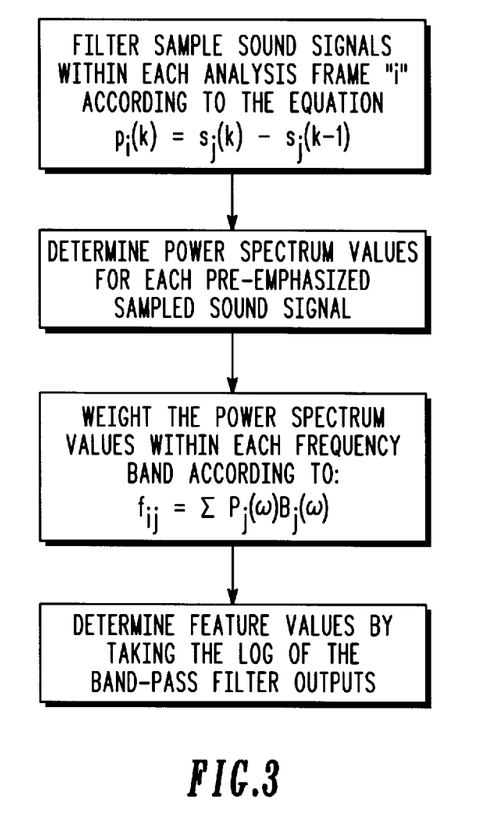
FIG. 3 shows a flow diagram of a method used to calculate feature values according to a preferred embodiment of the present invention.

After the values for the power spectrum are determined, the band-pass filters are applied in the frequency domain by a filter weighting value for each of the power spectrum values (330 of FIG. 3). Although many filter weighting functions may be used within the band-pass filters, the preferred embodiment incorporates a raised cosine weighting profile which can be seen in FIG. 4.

Figure 4:
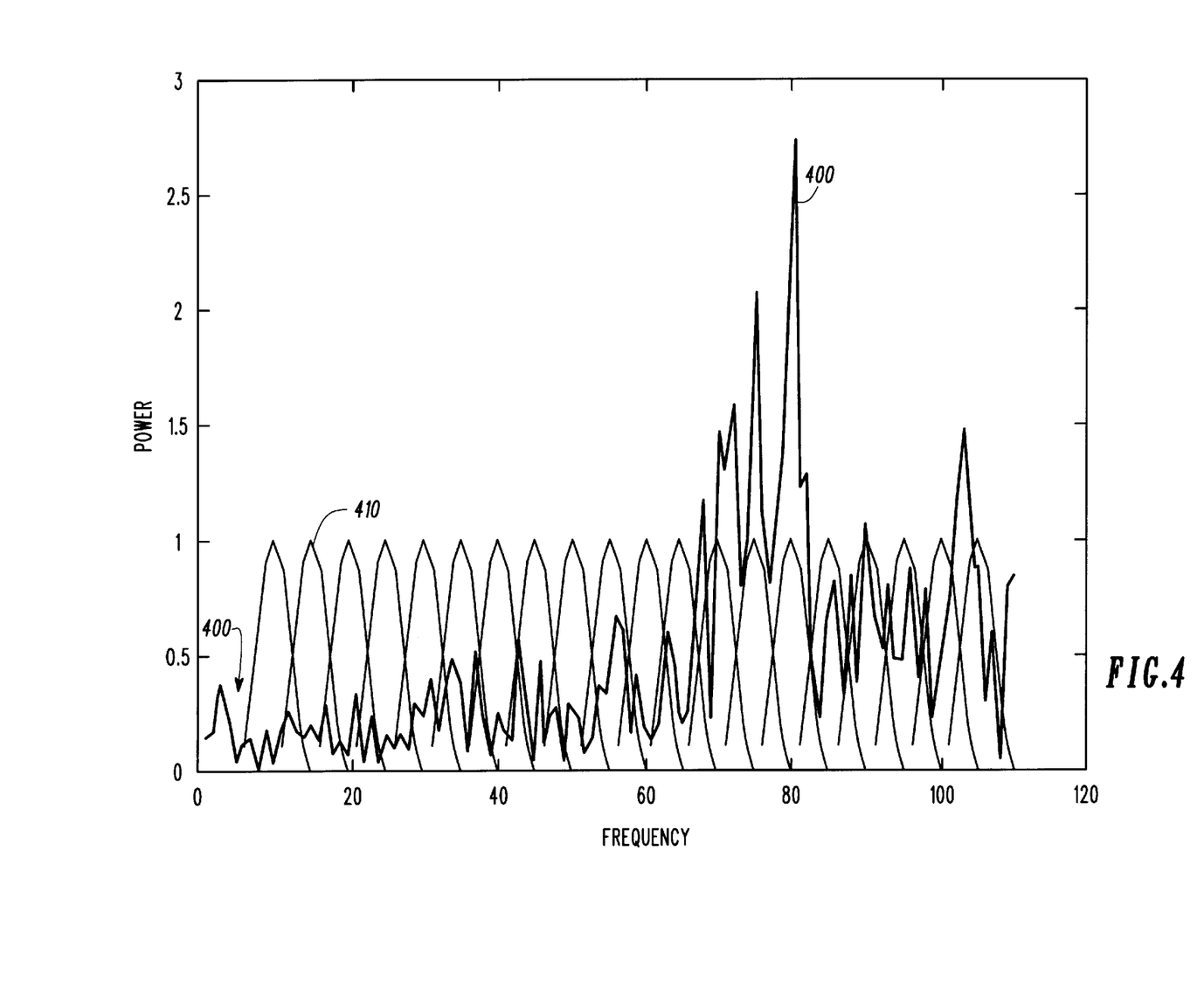
FIG. 4 is a representation of a power spectrum of a sampled sound signal with frequency filters imposed thereon according to the present invention.

FIG. 4 shows a power spectrum 400 having the raised cosine profile 410 imposed thereon. The frequency bands for each band-pass filter, or raised cosine profile 410, in the preferred embodiment of the present invention are laid out along the frequency axis according to a Mel or Bark scale which approximates the frequency response of the human ear. The frequency bands for the band-pass filters (raised cosine profiles 410) are approximately linearly spaced from 0 to 1 KHz, and logrithmically spaced above 1 KHz. Filter spacings other than those defined for the preferred embodiment may also be used. As seen in FIG. 4 for the preferred embodiment, the band-pass filters, or raised cosine profiles 410, overlap. The outputs for the band-pass filters, or raised cosine profiles 410, are computed according to:

$$f_{ij} = \Sigma P_i(\omega) B_j(\omega)$$

where $P_i(\omega)$ is the power spectrum value for analysis frame "i" at frequency $\omega$, $B_j(\omega)$ is the band-pass filter weighting function, or frequency response for filter "j" at frequency $\omega$, $\Sigma$ represents the summation operation over all frequencies $\omega$, and $f_{ij}$ is the band-pass filter output for analysis frame "i" and band-pass filter "j".

Figure 5:
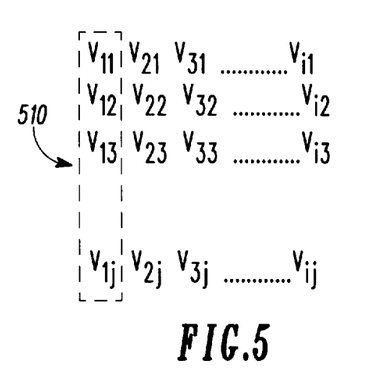
FIG. 5 shows a matrix of features of the sampled sound signal according to a preferred embodiment of the present invention.

After all the band-pass filter outputs for each analysis frame "i" ($0 \leq i \leq n$) and each band-pass filter "j" ($0 \leq j \leq m$) have been calculated, feature vector device 110 calculates feature values "$v_{ij}$" of the sampled sound signal by taking the log of each band-pass filter $f_{ij}$ (340 of FIG. 3). The result may be shown as a matrix such as the one illustrated in FIG. 5 structured with "i" analysis frames and "j" band-pass filters having a dimension of n×m. All of the feature values within an analysis frame, $v_{i1}$ through $v_{im}$, form a single feature vector (as in $v_{11}$ through $v_{1j}$, item 510), and all analysis frames, $0 \leq i \leq n$, form a plurality of feature vectors for the sampled sound signal.

Once the plurality of feature vectors for analysis frames "i"=1 through "n" have been computed, a min/max device 120 (FIG. 1) coupled to or incorporated within feature vector device 110 reviews all of the feature values within a frequency band for band-pass filter "j" and finds the minimum ($min_j$) feature value and the maximum ($max_j$) feature value for frequency band "j" for all analysis frames, $0 \leq i \leq n$ (220 of FIG. 2). These minimum and maximum values are used to determine normalized feature values, "v~".

Normalizer 130 of FIG. 1 is coupled to min/max device 120 and feature vector device 110. Normalizer 130 normalizes each of the feature values across a frequency band, or band-pass filter, "j", with the minimum and maximum feature values for that band-pass filter to determine the normalized feature values "v~" (230 of FIG. 2). The normalization equation is:

$$\tilde{v}_{ij} = (v_{ij} - min_j)/(max_j - min_j)$$

where $\tilde{v}_{ij}$ is one of the normalized feature values, $v_{ij}$ is one of the feature values, $min_j$ is the minimum feature value for the "$j^{th}$" frequency band, and $max_j$ is the maximum feature value for the "$j^{th}$" frequency band.

In an improved alternative embodiment, the min/max device 120 finds a weighted minimum ($min_j$) feature value and a weighted maximum ($max_j$) feature value for frequency band "j" for all analysis frames, $0 \leq i \leq n$ (220 of FIG. 2). These minimum and maximum values are computed as follows:

$$\omega_{minj} = \sum_{k=-r}^{r} weight[K] min[i+k]$$

$$\omega_{maxj} = \sum_{k=-r}^{r} weight[K] max[j+k]$$

where r is usually a small value such as 2 or 3, weight[k] is typically a weighting function where the central point, weight[0], has a value greater than or equal to all other weight values and $$\sum_{k=-r}^{r} \text{weight}[K] = 1.0.$$

In a particularly preferred embodiment, r=2 and weight[k] ={0.1, 0.2, 0.4, 0.2, 0.1}. These weighted minimum and weighted maximum values are used to determine the normalized feature values, "v~". In this embodiment the normalization equation is:

$$v{\sim}_{ij} = (v_{ij} - \omega\min_j)/(\omega\max_j - \omega\min_j)$$

where, $\omega\min_j$ is the weighted minimum feature value for the "jth" frequency band for all analysis frames $0 \leq i \leq n$, and $\omega\max_j$ is the weighted maximum feature value for the "jth" frequency band for all analysis frames $0 \leq i \leq n$.

Figure 6:
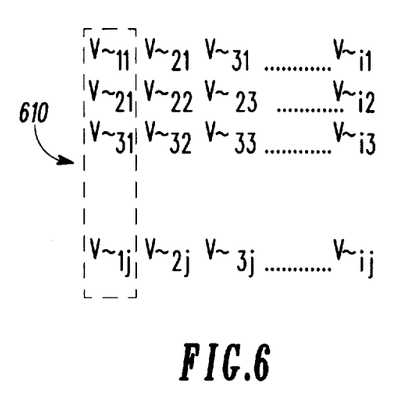
FIG. 6 shows a matrix of normalized features for the features of FIG. 3 according to a preferred embodiment of the present invention.

The result of the normalization process can be shown as a matrix as illustrated in FIG. 6. Each of the analysis frames "i" of FIG. 6 represents a normalized feature vector (610).

Comparator 140 of FIG. 1 is coupled to normalizer 130 and compares the normalized feature vectors with template feature vectors to determine which of the template feature vectors most resembles the normalized feature vectors. Sets of template feature vectors representing phrases or commands are stored within template feature vector library 150. Comparator 140 compares the normalized feature vectors from normalizer 130 with each of the template feature vectors in template feature vector library 150 in turn (240 of FIG. 2) and determines which set of the template feature vectors most resembles the normalized feature vectors (250). This is done by computing a distance metric between the normalized feature vectors and each of the sets of template feature vectors. The set of template feature vectors having the minimum distance metric is determined to be the one which most resembles the normalized feature vectors. Comparator 140 of FIG. 1 outputs as a best-fit match the set of template feature vectors from template feature vector library 150 which most resembles (has the minimum distance metric) the normalized feature vectors (250 of FIG. 2).

There are several well known methods whereby the plurality of normalized feature vectors may be compared with the template feature vectors to find a best-fit match. Studies using the preferred embodiment of the present invention show that comparing the plurality of normalized feature vectors with the template feature vectors in a dynamic time warping process yields the best results.

As mentioned earlier, the present invention when used in a speaker dependent, small vocabulary sound recognition system is very robust and increases recognition accuracy in high and variable noise environments from unusable accuracy rates to very high accuracy rates.

It should be recognized that the present invention may be used in many different sound recognition systems. All such varied uses are contemplated by the present invention.

What is claimed is:

1. A method comprising the steps of:

computing feature values for a number of analysis frames of an acoustic signal, the feature values computed over a plurality of frequency bands;

for each of the plurality of frequency bands, determining in a logarithmic domain which of the feature values within a respective one of the plurality of frequency bands is a minimum feature value over time and which of the feature values within the respective one of the plurality of frequency bands is a maximum feature value over time;

comparing within each frequency band each of the feature values with the minimum feature value and the maximum feature value of the respective frequency band to obtain normalized feature values, normalized over time within each of the frequency bands, wherein all of the normalized feature values for a given one of the number of analysis frames define one of a plurality of normalized feature vectors;

comparing the plurality of normalized feature vectors with sets of template feature vectors to determine template feature vectors that most resemble the plurality of normalized feature vectors; and outputting the template feature vectors that most resemble the plurality of normalized feature vectors.

2. A method according to claim 1 wherein each of the normalized feature vectors is found according to an equation:

$$v{\sim}_{ij} = (v_{ij} - \min_j)/(\max_j - \min_j)$$

where $v{\sim}_{ij}$ is one of the normalized feature values of an analysis frame "i" of the number of analysis frames and a frequency band "j" of the plurality of frequency bands;

$v_{ij}$ is one of the feature values at the analysis frame "i" and the frequency band "j";

$\min_j$ is the minimum feature value for the "j" frequency band; and $\max_j$ is the maximum feature value for the "j" frequency band.

3. A method according to claim 1 wherein the step of computing feature values comprises:

dividing a power spectrum of the acoustic sound signal into the plurality of frequency bands;

weighting the power spectrum within each of the plurality of frequency bands according to a weighting function to obtain filter outputs; and calculating the feature values from the filter outputs.

4. A method according to claim 3 wherein the power spectrum is weighted in a frequency domain according to a raised cosine profile.

5. A method according to claim 4 wherein the raised cosine profile calculates the filter outputs according to an equation:

$$f_{ij} = \Sigma P_i(\omega) B_j(\omega)$$

where $f_{ij}$ is one of the filter outputs at an analysis frame "i" of the number of analysis frames and a frequency band "j" of the plurality of frequency bands, $P_i(\omega)$ is a power spectrum value for the analysis frame "i" at frequency $\omega$, $B_j(\omega)$ is a band-pass filter weighting function, or frequency response, for the frequency band "j" at frequency $\omega$, and $\Sigma$ represents a summation operation over all frequencies $\omega$.

6. A method according to claim 1 wherein the step of comparing the normalized feature vectors with sets of template feature vectors to determine the template feature vectors that most resemble the normalized feature vectors includes comparing the normalized feature vectors with the sets of template feature vectors in a dynamic time warping process.

7. A method according to claim 3 wherein the step of calculating the feature values from the filter outputs comprises taking a log of each of the filter outputs.

8. A method according to claim 3 wherein the power spectrum is divided into the plurality of frequency bands according to a Mel or Bark scale to approximate a frequency response of a human ear.

9. A sound recognizer comprising:
a feature vector device which computes feature values for a number of analysis frames of an acoustic signal input to the sound recognizer, the feature values computed for a plurality of frequency bands;
a min/max device coupled to the feature vector device to determine in a logarithmic domain which of the feature values within a respective one of the plurality of frequency bands is a minimum feature value over time and which of the feature values within the respective one of the plurality of frequency bands is a maximum feature value over time for each of the plurality of frequency bands across all the number of analysis frames;
a normalizer coupled to the min/max device which compares, within each of the plurality of frequency bands, each of the feature values with the minimum feature value and the maximum feature value of the respective one of the plurality of frequency bands to obtain normalized feature values, normalized over time within each of the frequency bands, wherein all of the normalized feature values for a given one of the analysis frames define one of a plurality of normalized feature vectors; and
a comparator coupled to the normalizer which compares the plurality of normalized feature vectors with sets of template feature vectors to determine template feature vectors that most resemble the plurality of normalized feature vectors, the comparator outputting the template feature vectors that most resemble the plurality of normalized feature vectors.

10. A sound recognizer according to claim 9 wherein the normalizer computes each of the plurality of normalized feature vectors according to the equation:

$$v\sim_{ij}=(v_{ij}-\min_j)/(\max_j-\min_j)$$

where $v\sim_{ij}$ is one of the normalized feature values of an analysis frame "i" of the number of analysis frames and a frequency bands at "j" of the plurality of frequency bands;
$v_{ij}$ is one of the feature values at the analysis frame "i" and the frequency band "j";
$\min_j$ is the minimum feature value for the "j" frequency band; and
$\max_j$ is the maximum feature value for the "j" frequency band.

11. A sound recognizer according to claim 9 wherein the comparator is coupled to a template feature vector library, the template feature vector library containing the sets of template feature vectors.

12. A method comprising the steps of:
computing feature values for a number of analysis frames of an acoustic signal, the feature values computed over a plurality of frequency bands;
for each of the plurality of frequency bands, determining in a logarithmic domain which of the feature values within a respective one of the plurality of frequency bands is a minimum feature value over time and which of the feature values within the respective one of the plurality of frequency bands is a maximum feature value over time;
comparing each of the feature values within each of the plurality of frequency bands with the minimum feature value and the maximum feature value of the respective one of the plurality of frequency bands to obtain normalized feature values, wherein all of the normalized feature values for a given one of the number of analysis frames define one of a plurality of normalized feature vectors, each of the normalized feature values found according to the equation:

$$v\sim_{ij}=(v_{ij}-\min_j)/(\max_j-\min_j)$$

where $v\sim_{ij}$ is one of the normalized feature values of an analysis frame "i" of the number of analysis frames and a frequency bands at "j" of the plurality of frequency bands, $v_{ij}$ is one of the feature values at the analysis frame "i" and the frequency band "j", $\min_j$ is the minimum feature value for the "j" frequency band, and $\max_j$ is the maximum feature value for the "j" frequency band;
comparing the plurality of normalized feature vectors with sets of template feature vectors to determine template feature vectors that most resemble the plurality of normalized feature vectors; and
outputting the template feature vectors that most resemble the plurality of normalized feature vectors.

13. A method according to claim 12 wherein the step of computing a plurality of feature values comprises:
dividing a power spectrum of the acoustic sound signal into the plurality of frequency bands;
weighting the power spectrum within each of the plurality of frequency bands according to a weighting function to obtain filter outputs; and
calculating the plurality of feature values from the filter outputs.

14. A method according to claim 13 wherein the power spectrum is weighted in a frequency domain according to a raised cosine profile.

15. A method according to claim 14 wherein the raised cosine profile calculates the filter outputs according to an equation:

$$f_{ij}=\Sigma P_i(\omega)B_j(\omega)$$

where $f_{ij}$ is one of the filter outputs at an analysis frame "i" of the number of analysis frames and a frequency band "j" of the plurality of frequency bands, $P_i(\omega)$ is a power spectrum value for the analysis frame "i" at frequency $\omega$, $B_j(\omega)$ is a band-pass filter weighting function, or frequency response, for the frequency band "j" at frequency $\omega$, and $\Sigma$ represents a summation operation over all frequencies $\omega$.

16. A method according to claim 12 wherein the step of comparing the normalized feature vectors with sets of template feature vectors to determine template feature vectors that most resemble the normalized feature vectors includes comparing the normalized feature vectors with the sets of template feature vectors in a dynamic time warping process.

17. A method according to claim 13 wherein the step of calculating the plurality of feature values from the filter outputs comprises taking a log of each of the filter outputs.

18. A method according to claim 13 wherein the power spectrum is divided into the plurality of frequency bands according to a Mel or Bark scale to approximate a frequency response of a human ear.

19. A sound recognizer comprising:
a feature vector device which computes feature values for a number of analysis frames of an acoustic signal input to the sound recognizer, the feature values computed for a plurality of frequency bands;
a min/max device coupled to the feature vector device to determine in a logarithmic domain which of the feature values within a respective one of the plurality of frequency bands is a minimum feature value over time and which of the feature values within the respective one of the plurality of frequency bands is a maximum feature value over time for each of the plurality of frequency bands across all the number of analysis frames;

a normalizer coupled to the min/max device which compares each of the feature values within each of the plurality of frequency bands with the minimum feature value and the maximum feature value of the respective one of the plurality of frequency bands to obtain normalized feature values, wherein all of the normalized feature values for a given one of the analysis frames define one of a plurality of normalized feature vectors, each of the normalized feature values found according to an equation:

$$v\sim_{ij}=(v_{ij}-\min_j)/(\max_j-\min_j)$$

where $v\sim_{ij}$ is one of the normalized feature values of an analysis frame "i" of the number of analysis frames and a frequency bands at "j" of the plurality of frequency bands, $v_{ij}$ is one of the feature values at the analysis frame "i" and the frequency band "j", $\min_j$ is the minimum feature value for the "j" frequency band, and $\max_j$ is the maximum feature value for the "j" frequency band; and a comparator coupled to the normalizer which compares the plurality of normalized feature vectors with sets of template feature vectors to determine template feature vectors that most resemble the plurality of normalized feature vectors, the comparator outputting the template feature vectors that most resemble the plurality of normalized feature vectors.

20. A voice recognizer according to claim 19 wherein the comparator is coupled to a template feature vector library, the template feature vector library containing the template feature vectors.

21. A sound recognizer comprising:

a feature vector device which computes feature values for a number of analysis frames of an acoustic signal input to the sound recognizer, the feature values computed for a plurality of frequency bands;

a min/max device coupled to the feature vector device to determine in a logarithmic domain which of the feature values within a respective one of the plurality of frequency bands is a minimum feature value and which of the feature values within the respective one of the plurality of frequency bands is a maximum feature value for each of the plurality of frequency bands across all the number of analysis frames;

a normalizer coupled to the min/max device which compares each of the feature values within each of the plurality of frequency bands with the minimum feature value and the maximum feature value of the respective one of the plurality of frequency bands to obtain normalized feature values, wherein all of the normalized feature values for a given one of the analysis frames defines one of a plurality of normalized feature vectors; and a comparator coupled to the normalizer which compares the plurality of normalized feature vectors with sets of template feature vectors to determine template feature vectors that most resemble the plurality of normalized feature vectors, the comparator outputting the template feature vectors that most resemble the plurality of normalized feature vectors, wherein the min/max device has a weighted minimum feature value and a weighted maximum feature value for frequency band "j" for all analysis frames, $0 \leq i \leq n$, where the minimum and maximum feature values are computed as follows:

$$\omega_{minj} = \sum_{k=-r}^{r} \text{weight}[K]\min + [+jk]$$

$$\omega_{maxj} = \sum_{k=-r}^{r} \text{weight}[K]\max + [+jk]$$

where weight[k] is a weighting function having a central point having a value greater than or equal to all other weight values.

22. A sound recognizer according to claim 21 where $$\sum_{k=-r}^{r} \text{weight}[K] = 1.$$

* * * * *